United States Patent
Li et al.

(10) Patent No.: US 11,256,166 B2
(45) Date of Patent: Feb. 22, 2022

(54) STRUCTURE OF SHORT-THROW AMBIENT LIGHT REJECTING SCREEN

(71) Applicant: PROBRIGHT TECHNOLOGY INC., New Taipei (TW)

(72) Inventors: Chia-Pin Li, New Taipei (TW);
Mao-Kuei Wang, New Taipei (TW);
Shih-Min Fu, New Taipei (TW);
Yao-Nan Hsu, New Taipei (TW)

(73) Assignee: Probright Technology Inc., New Taipei (TW)

( * ) Notice: Subject to any disclaimer, the term of this patent is extended or adjusted under 35 U.S.C. 154(b) by 0 days.

(21) Appl. No.: 16/929,549

(22) Filed: Jul. 15, 2020

(65) Prior Publication Data
US 2021/0302823 A1    Sep. 30, 2021

(30) Foreign Application Priority Data

Mar. 30, 2020    (TW) ................ 109110863

(51) Int. Cl.
*G03B 21/60*    (2014.01)
*G03B 21/58*    (2014.01)
(Continued)

(52) U.S. Cl.
CPC ............ *G03B 21/60* (2013.01); *G03B 21/56* (2013.01); *G03B 21/58* (2013.01); *G03B 21/62* (2013.01); *G03B 21/625* (2013.01)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS

2007/0115570 A1*  5/2007  Hwang .............. G02B 5/045
                                                          359/833
2007/0217005 A1*  9/2007  Novet ............... G03B 21/60
                                                          359/459
(Continued)

FOREIGN PATENT DOCUMENTS

CN    205594299    *  9/2016    ........... G03B 21/60
CN    109634045    *  4/2019    ........... G03B 21/60

*Primary Examiner* — Clayton E. LaBalle
*Assistant Examiner* — Kevin C Butler
(74) *Attorney, Agent, or Firm* — Rosenberg, Klein & Lee

(57) ABSTRACT

The present invention provides a structure of short-throw ambient light rejecting screen, which comprises a base and an optical structure device disposed on the base. The optical structure device includes a plurality of optical structure parts. Each of the plurality of optical structure parts includes a first side, a second side, and a base part. The first side and the base form a first angle for reflecting a light source. The second side and the base form a second angle for absorbing a light source. The base part is a length on the base confined by first side and the second side. The first angle is 20~40 degrees. The second angle is 70~90 degrees. The length on the base part is 250~350 um. By adjusting the first angle, the second angle, and the length on the base part of each optical structure part, the height of the optical structure part can be maintained constant. In addition, the differences between the incident projection angles can be reduced as well. By improving the process yield, the appearance of the scrolled screen can form a neat cylinder.

7 Claims, 4 Drawing Sheets

(51) Int. Cl.
    *G03B 21/56*     (2006.01)
    *G03B 21/625*     (2014.01)
    *G03B 21/62*     (2014.01)

(58) Field of Classification Search
    USPC ........................................................ 359/443
    See application file for complete search history.

(56) References Cited

U.S. PATENT DOCUMENTS

| | | | |
|---|---|---|---|
| 2008/0129933 A1* | 6/2008 | Nishida | G02F 1/133502 349/96 |
| 2009/0153958 A1* | 6/2009 | Huibers | G03B 21/60 359/459 |
| 2013/0050814 A1* | 2/2013 | Jeon | G03B 21/60 359/449 |
| 2019/0346757 A1* | 11/2019 | Su | G02B 5/0263 |

* cited by examiner

STRUCTURE OF SHORT-THROW AMBIENT LIGHT REJECTING SCREEN

FIELD OF THE INVENTION

The present invention relates generally to a structure of ambient light rejecting screen, and particularly to a structure of short-throw ambient light rejecting screen.

BACKGROUND OF THE INVENTION

In recent years, the TV industry faces revolution. Due to the change in the hardware system, the era of traditional cathode-ray-tube TVs has been replaced completely by liquid-crystal display (LCD) TVs. LCD TVs not only receive analog and digital signals concurrently, they are the best vehicles for promoting digital TVs. Nowadays, the thickness and size of screens are the main focus of LCD TVs. Many brands provide ultra-thin screens with sizes greater than 40 inches.

As the coming of TV revolution, modern people lay stress on home entertainment devices. Large screens have become the must-have equipment in every family. Since large LCD TVs are expensive, high-resolution projectors have gradually replaced general LCD TVs. Unfortunately, general projectors require longer projection distance. The projection performance is also vulnerable to ambient light. Thereby, more manufacturers provide short-throw projection TVs (also known as laser TVs) with the accompanying ambient light rejecting screen recently. In other words, an ultra-short-throw projector is used as the image source projecting on an accompanying special optical screen. The major difference with the traditional projector is that the projection distance is reduced significantly. In addition, the viewing will not be affected by the ambient light. While using a traditional projector, the interference from the ambient light must be avoided. By using the short-throw projector with an ambient light rejecting screen, the requirements of large screen and least space by users can be satisfied.

Traditional projection screens are ordinary white screens (including white walls). A projector projects light on a screen or a white wall for producing images. The images we see are formed by the light reflected to the retinas. Thereby, for traditional projection screens, the light projected thereon will be scattered at 180° in the space.

To sharpen the images projected by a laser TV, an ambient light rejecting screen is developed for absorbing ambient light significantly as well as enhancing image contrast and color saturation. Ambient light rejection is achieved by the optical coatings and the physical structure of the ambient light rejecting screen. In addition to absorbing the ambient light, the light projected by the projector can be controlled to reflect to the user's viewing field and hence reducing the interference from the ambient light and increasing the projection light received in the viewing field. Accordingly, the seen image colors and contrast will be improved significantly.

The structure of ambient light rejecting screen according to the prior art owns a sawtooth-shaped base. The surface sawteeth are equally spaced. Thereby, the incident angle of the projector onto the topmost portion of the ambient light rejecting screen differs greatly from the one onto the bottommost portion, disabling complete functions of the reflection surface.

According to China Patent Publication No. CN109634045A, an ambient light rejecting screen with variable spacings is disclosed. The screen comprises a base layer and a prism-shaped structure layer. The prism-shaped structure layer includes a plurality of horizontal prisms with triangular cross-sections. The spacings between the prisms (the distance between the tops of adjacent prisms) increase gradually from the bottom to the top and forming a graded structure. In addition, according to Taiwan Patent Publication No. TW M577512, a short-throw front-projection ambient light rejecting screen. The grading structure is formed by adjusting the first angle between the light absorbing side and the reflecting side of the optical structure parts and the second angle between the reflecting side and the other surface of the optical structure member. Unfortunately, in the grading structure according to the prior art, the variation of the height of the structure is not considered, increasing the fabrication difficulty. Consequently, the flatness of the film surface is reduced.

Furthermore, China Patent Publication No. CN205594299U provides an ambient light rejecting screen formed by a base layer and a protection layer. The base layer includes a plurality of interlacing light absorbing layers and imaging layers and forming a sawtooth structure. The light absorbing layer is perpendicular to the base layer with a height of 150~250 um. The angle between the imaging layer and the base layer is 35~45 degrees.

According to the above, the present invention provides a structure of short-throw ambient light rejecting screen for achieving a grading and equal-height structure with significantly lowered fabrication difficulty and improved flatness of the film surface.

SUMMARY

An objective of the present invention is to provide a structure of short-throw ambient light rejecting screen. By adjusting the first angle, the second angle, and the length of the bottom part of the optical structure parts, the requirements for a grading and equal-height structure with significantly lowered fabrication difficulty and improved flatness of the film surface can be achieved.

To achieve the above objective, the present invention provides a structure of short-throw ambient light rejecting screen, which comprises a base and an optical structure device disposed on the base. The optical structure device includes a plurality of optical structure parts. Each of the plurality of optical structure parts includes a first side, a second side, and a base part. The first side and the base form a first angle for reflecting a light source. The second side and the base form a second angle for absorbing a light source. The base part is a length on the base confined by first side and the second side. The first angle is 20~40 degrees. The second angle is 70~90 degrees. The length on the base part is 250~350 um.

According to an embodiment of the present invention, the base is formed by polyethylene terephthalate (PET) or thermoplastic polyurethanes (TPU).

According to an embodiment of the present invention, the sum of the height of the base and the height of the optical structure device is 360~400 um.

According to an embodiment of the present invention, the base further includes a black absorbing layer disposed below the base for increasing light absorptivity.

According to an embodiment of the present invention, the first side further includes an image reflection layer.

According to an embodiment of the present invention, the image reflection layer further includes a glue layer and an anti-glare layer disposed on the glue layer.

According to an embodiment of the present invention, the anti-glare layer is formed by micro transparent particles or silicon dioxide.

DETAILED DESCRIPTION

In the grading structure of the ambient light rejecting screen according to the prior art, the structure height is not considered. Consequently, the fabrication difficulty is increased; the flatness of the film surface is lowered; and the height differences occur on the film surface of the product.

The present invention provides a structure of ambient light rejecting screen. By adjusting the first angle, the second angle, and the length on the base part of each optical structure part, the height of the grading structure and the structure can be maintained constant. By improving the flatness of the film of the product, the appearance of the scrolled screen can form a neat cylinder.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
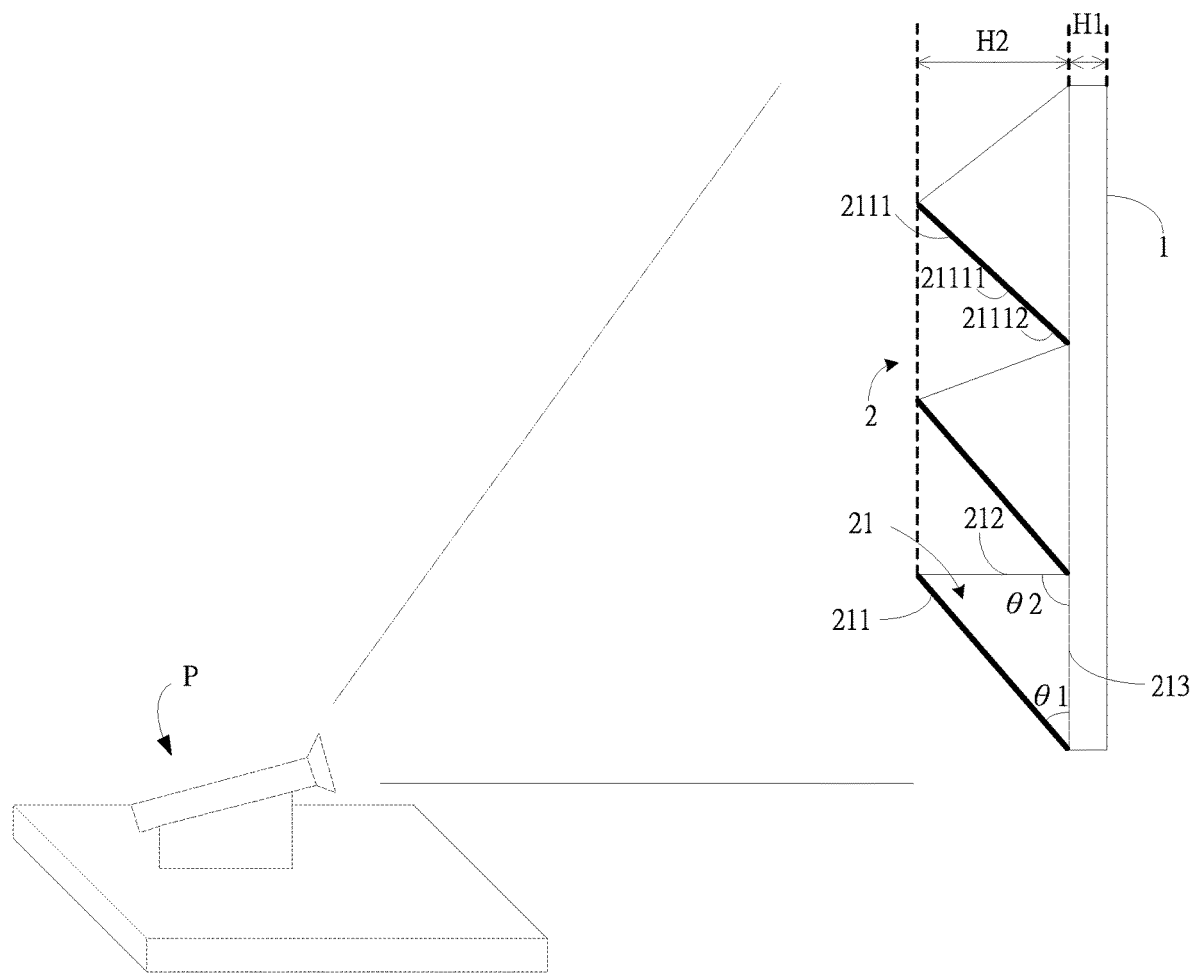
FIG. 1 shows a schematic diagram of the structure of short-throw ambient light rejecting screen according to an embodiment of the present invention.

First, please refer to FIG. 1, which shows a schematic diagram of the structure of short-throw ambient light rejecting screen according to an embodiment of the present invention. The present invention provides a structure of short-throw ambient light rejecting screen, which comprises a base 1 and an optical structure device 2 disposed on the base 1. The optical structure device 2 includes a plurality of optical structure parts 21. Each of the plurality of optical structure parts 21 includes a first side 211, a second side 212, and a base part 213. The first side 211 and the base 1 form a first angle $\theta 1$, which is 20~40 degrees. The second side 212 and the base 1 form a second angle $\theta 2$, which is 70~90 degrees. The base part 213 is a length on the base 1, which is 250~350 um. In other words, the optical structure part 21 form a sawtooth structure using the first side 211, the second side 212, and the base part 213. When a user uses the projector P to project a light source to the optical structure device 2, the first side 211 of the optical structure part 21 reflects the light source to the user for viewing.

According to the present embodiment, the base 1 further includes a black absorbing layer disposed below the base 1 for increasing light absorptivity effectively. The base is formed by polyethylene terephthalate (PET) or thermoplastic polyurethanes (TPU). The base height H1 is approximately 188 um. The height H2 of the optical structure part 21 is approximately 192 um. Namely, the sum of the base height H1 and the height H2 of the optical structure part 21 is 380 um with the manufacturing tolerance of ±20 um. The first side 211 includes an image reflection layer, which includes a glue layer and an anti-glare layer disposed on the glue layer for avoiding reflection from the glue layer. The anti-glare layer is formed by micro transparent particles or silicon dioxide.

Figure 2A:
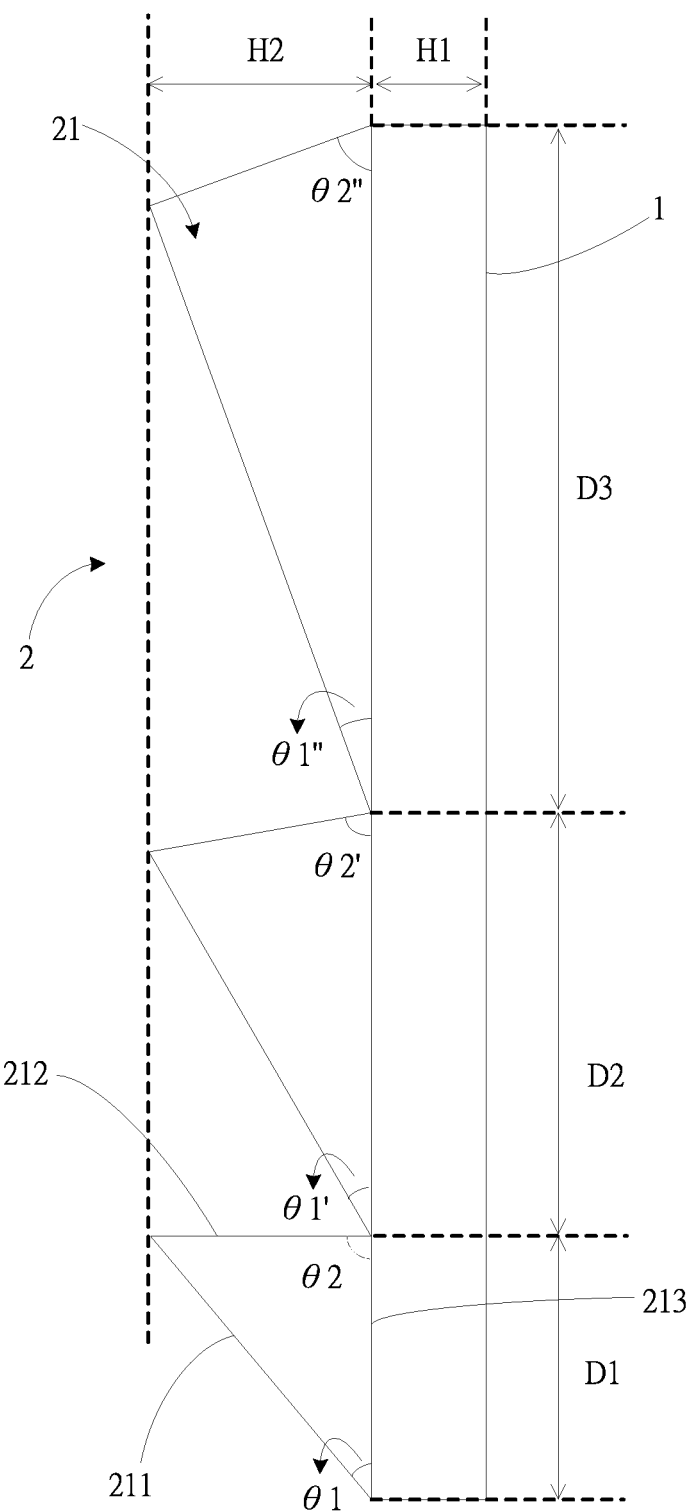
FIG. 2A shows a schematic diagram of the structure of short-throw ambient light rejecting screen according to the first embodiment of the present invention.

Please refer to FIG. 2A, which shows a schematic diagram of the structure of short-throw ambient light rejecting screen according to the first embodiment of the present invention. The first angles of the plurality of optical structure parts 21 are $\theta 1$, $\theta 1'$, and $\theta 1''$, respectively, and equal to 40, 30, and 20 degrees, respectively. The second angles of the plurality of optical structure parts 21 are $\theta 2$, $\theta 2'$, and $\theta 2''$, respectively, and equal to 90, 80, and 70 degrees, respectively. The length of the base part 213 are D1, D2, and D3, respectively, and equal to 250 um, 300 um, and 350 um, respectively. Thereby, the height H2 of the optical structure part 21 can be maintained constant. In other words, the first angles and the second angles decrease gradually while the lengths of the base part 213 increase gradually.

Figure 2B:
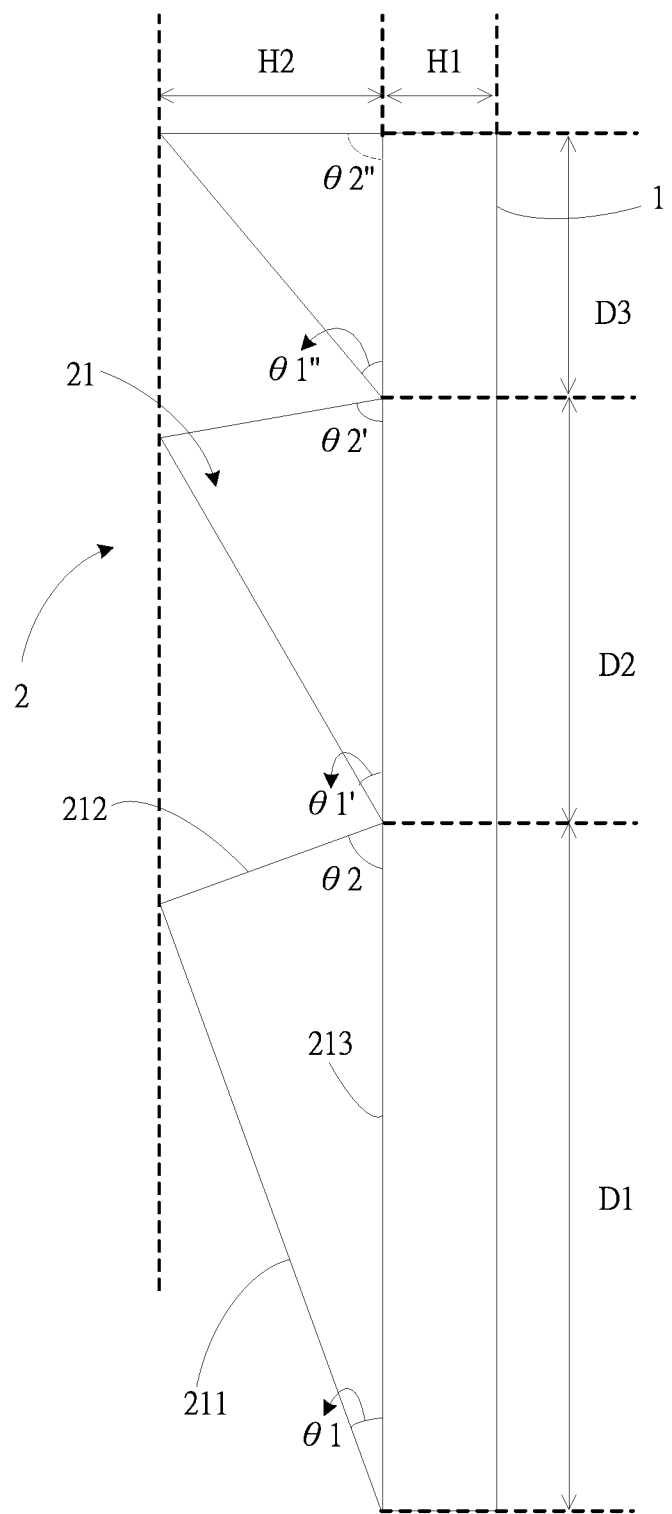
FIG. 2B shows a schematic diagram of the structure of short-throw ambient light rejecting screen according to the second embodiment of the present invention.

Please refer to FIG. 2B, which shows a schematic diagram of the structure of short-throw ambient light rejecting screen according to the second embodiment of the present invention. The first angles of the plurality of optical structure parts 21 are $\theta 1$, $\theta 1'$, and $\theta 1''$, respectively, and equal to 20, 30, and 40 degrees, respectively. The second angles of the plurality of optical structure parts 21 are $\theta 2$, $\theta 2'$, and $\theta 2''$, respectively, and equal to 70, 80, and 90 degrees, respectively. The length of the base part 213 are D1, D2, and D3, respectively, and equal to 350 um, 300 um, and 250 um, respectively. Thereby, the height H2 of the optical structure part 21 can be maintained constant. In other words, the first angles and the second angles increase gradually while the lengths of the base part 213 decrease gradually.

Figure 2C:
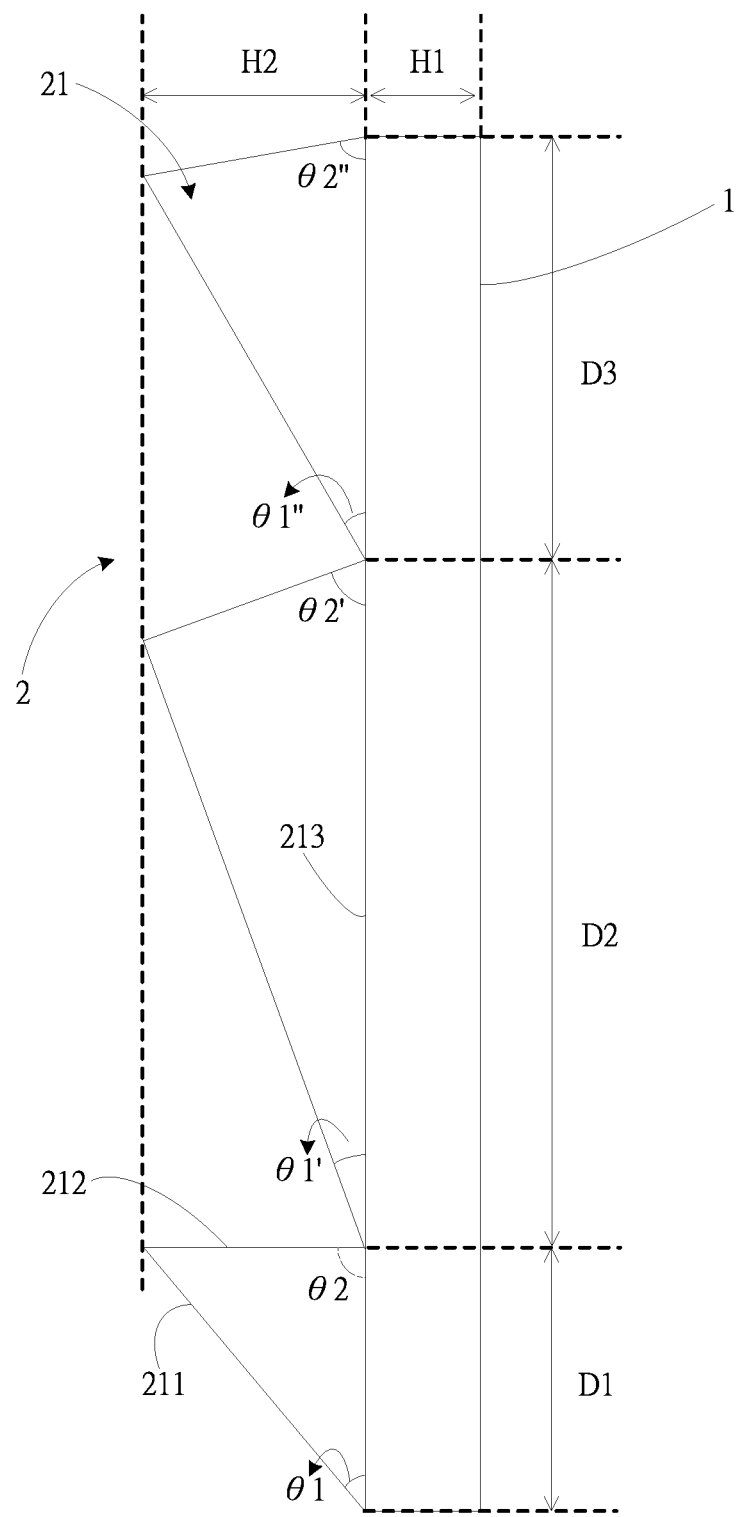
FIG. 2C shows a schematic diagram of the structure of short-throw ambient light rejecting screen according to the third embodiment of the present invention.

Please refer to FIG. 2C, which shows a schematic diagram of the structure of short-throw ambient light rejecting screen according to the third embodiment of the present invention. The first angles of the plurality of optical structure parts 21 are $\theta 1$, $\theta 1'$, and $\theta 1''$, respectively, and equal to 40, 20, and 30 degrees, respectively. The second angles of the plurality of optical structure parts 21 are $\theta 2$, $\theta 2'$, and $\theta 2''$, respectively, and equal to 90, 70, and 80 degrees, respectively. The length of the base part 213 are D1, D2, and D3, respectively, and equal to 250 um, 350 um, and 300 um, respectively. Thereby, the height H2 of the optical structure part 21 can be maintained constant. In other words, the first angles and the second angles increase gradually while the lengths of the base part 213 decrease gradually.

Specifically, the first angle $\theta 1$ of the plurality of optical structure parts 21 can be adjusted within the range of 20~40 degrees. The adjusting method can be regular, such as increasing gradually from 20 degrees to 24, 26, and 40 degrees. Alternatively, the first angle $\theta 1$ can be decreased gradually from 40 degrees to 38, 36, and 20 degrees. Alternatively, the adjusting method can be irregular, such as 27, 30, and 36 degrees. Likewise, the second angle $\theta 2$ of the plurality of optical structure parts 21 can be adjusted within the range of 70~90 degrees. The adjusting method can be regular, such as increasing gradually from 70 degrees to 72, 74, and 90 degrees. Alternatively, the second angle $\theta 2$ can be decreased gradually from 90 degrees to 88, 86, and 70 degrees. Alternatively, the adjusting method can be irregular, such as 78, 85, and 76 degrees. As for the lengths of the base parts 213, since the first angles $\theta 1$ and the second angles $\theta 2$ are different, the lengths of the base parts 213 will be within 250~350 um.

According to the embodiment of the present invention, by adjusting the first angle $\theta 1$, the second angle $\theta 2$, and the length on the base part 213 of each optical structure part 21, the height H2 of the optical structure part 21 can be maintained constant. Thereby, the differences between the incident projection angles can be reduced. By improving the process yield, the appearance of the scrolled screen can form a neat cylinder.

To sum up, the present invention provides a structure of short-throw ambient light rejecting screen. By adjusting the first angle between the first side of the optical structure part and the base, the second angle between the second side of the optical structure part and the base, and the length on the base part of the optical structure part, the height of the optical structure part can be maintained constant. In addition, the differences between the incident projection angles can be reduced as well. By improving the process yield, the appearance of the scrolled screen can form a neat cylinder.

The invention claimed is:

1. A structure of short-throw ambient light rejecting screen, comprising:
   a base; and
   an optical structure device, disposed on said base, including a plurality of optical structure parts, and each of said plurality of optical structure parts including:
   a first side, forming a first angle with said base for reflecting a light source;
   a second side, forming a second angle with said base for absorbing a light source; and
   a base part, being a length on said base and confined by said first side and said second side;
   where said first angle is 20~40 degrees; said second angle is 70~90 degrees; and said length on said base part is 250~350 um, said first angles and said second angles of said optical structure parts are increased gradually while said lengths of said base parts included in said optical structure parts are decreased gradually, and heights of said optical structure parts are maintained constant.

2. The structure of short-throw ambient light rejecting screen of claim 1, wherein said base is formed by polyethylene terephthalate (PET) or thermoplastic polyurethanes (TPU).

3. The structure of short-throw ambient light rejecting screen of claim 1, wherein the sum of the height of said base and the height of said optical structure device is 360~400 um.

4. The structure of short-throw ambient light rejecting screen of claim 1, wherein said base further includes a black absorbing layer disposed below said base for increasing light absorptivity.

5. The structure of short-throw ambient light rejecting screen of claim 1, wherein said first side further includes an image reflection layer.

6. The structure of short-throw ambient light rejecting screen of claim 5, wherein said image reflection layer further includes a glue layer and an anti-glare layer disposed on said glue layer.

7. The structure of short-throw ambient light rejecting screen of claim 6, wherein said anti-glare layer is formed by micro transparent particles or silicon dioxide.

* * * * *